US012092987B2

(12) United States Patent
Yamashita et al.

(10) Patent No.: US 12,092,987 B2
(45) Date of Patent: Sep. 17, 2024

(54) IMAGE FORMING APPARATUS

(71) Applicant: CANON KABUSHIKI KAISHA, Tokyo (JP)

(72) Inventors: Fuyuto Yamashita, Kanagawa (JP); Kazuhiro Hosohara, Kanagawa (JP); Tomoya Tateishi, Kanagawa (JP); Tatsuo Nishiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/938,007

(22) Filed: Oct. 4, 2022

(65) Prior Publication Data

US 2023/0109402 A1 Apr. 6, 2023

(30) Foreign Application Priority Data

Oct. 5, 2021 (JP) ................................ 2021-163856
Nov. 16, 2021 (JP) ................................ 2021-186698

(51) Int. Cl.
*G03G 21/16* (2006.01)
*G03G 15/00* (2006.01)

(52) U.S. Cl.
CPC ..... *G03G 21/1638* (2013.01); *G03G 15/6502* (2013.01); *G03G 15/6514* (2013.01);
(Continued)

(58) Field of Classification Search
CPC ........... G03G 15/6502; G03G 15/6514; G03G 2215/0054; G03G 2215/00544;
(Continued)

(56) References Cited

U.S. PATENT DOCUMENTS 8,768,235 B2 * 7/2014 Asada ...................... B65H 1/08 399/397
8,960,664 B2 * 2/2015 Maeda .................. B65H 1/266 399/110
(Continued)

FOREIGN PATENT DOCUMENTS

JP 2006069732 A * 3/2006
JP 2008105791 A 5/2008
(Continued)

*Primary Examiner* — Justin N Olamit
(74) *Attorney, Agent, or Firm* — Canon U.S.A., Inc. IP Division

(57) ABSTRACT

An image forming apparatus includes an attachable/detachable storage unit having a positioned portion projecting downstream in an attachment direction of the storage unit, a conveyance member, an image forming unit to form an image on a sheet conveyed by the conveyance member, and a conveyance unit to move between a first position and a second position. Engagement of the positioned portion with a positioning portion of the image forming apparatus causes the storage unit to be positioned with respect to the image forming apparatus. The conveyance unit includes a contact portion and a depressed portion. In a case where the contact portion of the conveyance unit comes into contact with the storage unit and the conveyance unit is moved from the second position to the first position by the storage unit, the positioned portion does not come into contact with the depressed portion of the conveyance unit.

11 Claims, 13 Drawing Sheets

(52) U.S. Cl.
CPC ............... *G03G 2215/0054* (2013.01); *G03G 2215/00675* (2013.01)

(58) Field of Classification Search
CPC ..... G03G 2215/00675; G03G 21/1623; G03G 21/1638; G03G 21/1647; G03G 2221/1675; G03G 2221/1684; B65H 2402/32; B65H 2402/441; B65H 2405/332; B65H 2601/11
See application file for complete search history.

(56) References Cited

U.S. PATENT DOCUMENTS

| | | | | |
|---|---|---|---|---|
| 9,056,745 | B2 * | 6/2015 | Harada | B65H 5/062 |
| 9,533,849 | B2 * | 1/2017 | Kasaishi | B65H 5/36 |
| 9,796,542 | B2 * | 10/2017 | Shiohara | B65H 3/0684 |
| 10,322,896 | B2 * | 6/2019 | Furuta | B65H 5/38 |

FOREIGN PATENT DOCUMENTS

| | | | |
|---|---|---|---|
| JP | 2016222384 | A | 12/2016 |
| JP | 2017081738 | A | 5/2017 |
| JP | 2018095427 | A | 6/2018 |

* cited by examiner

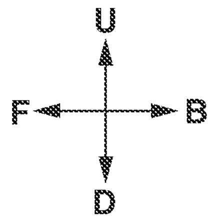
FIG.8A
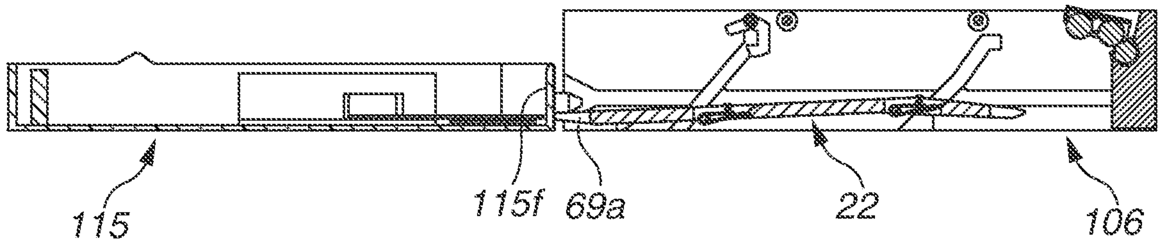
FIG.8B
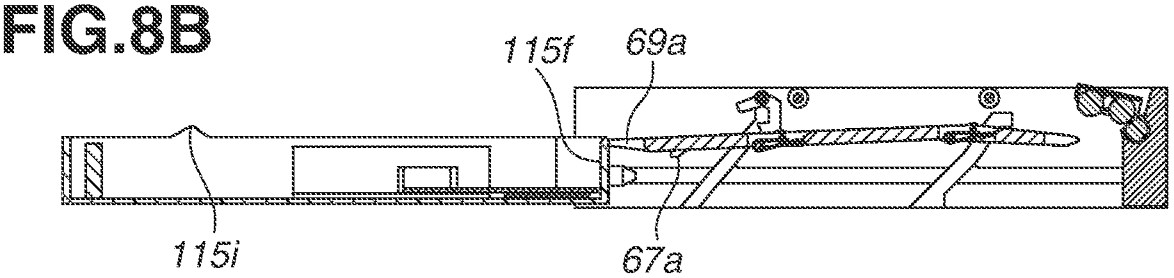
FIG.8C
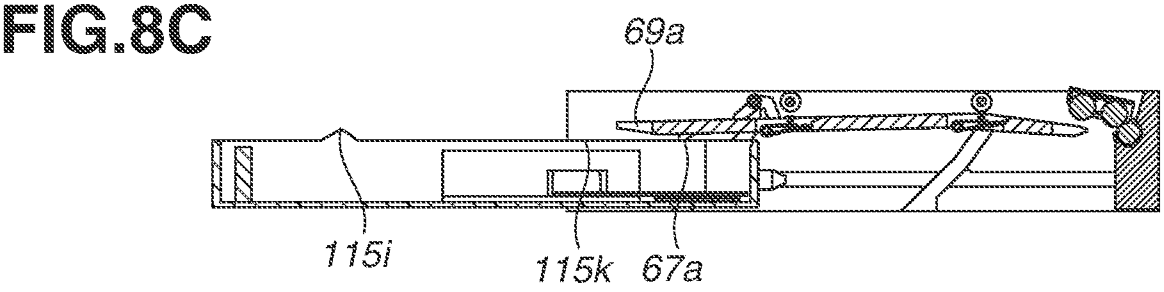
FIG.8D
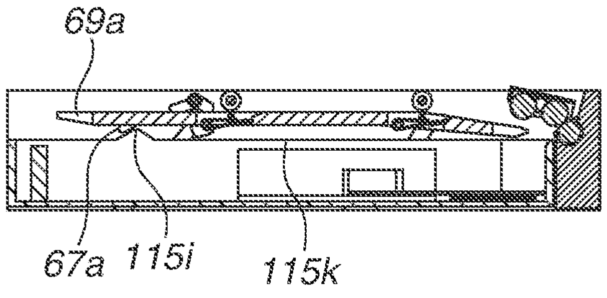

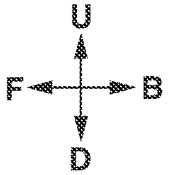
FIG.13A
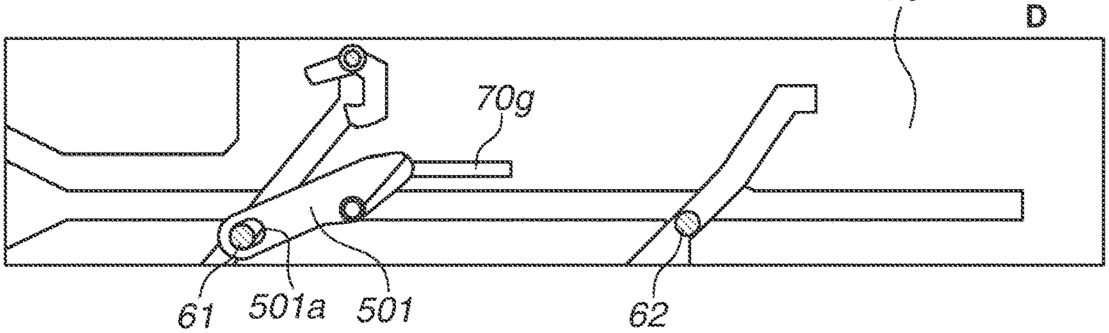
FIG.13B
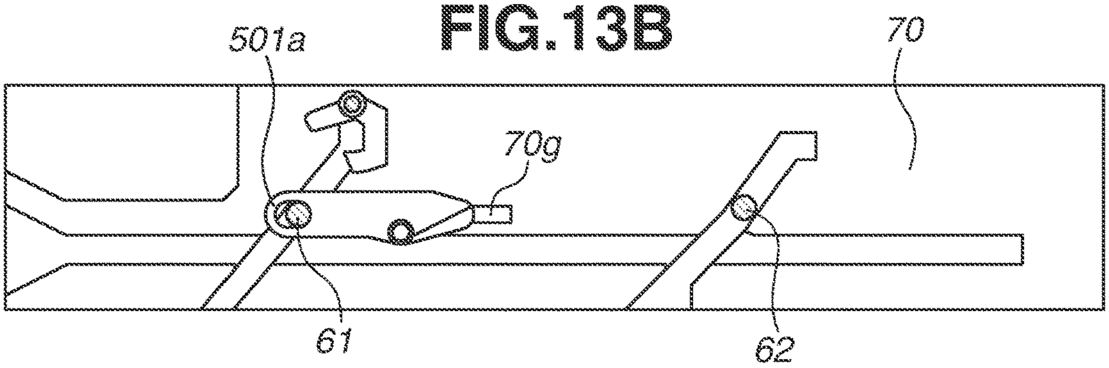
FIG.13C
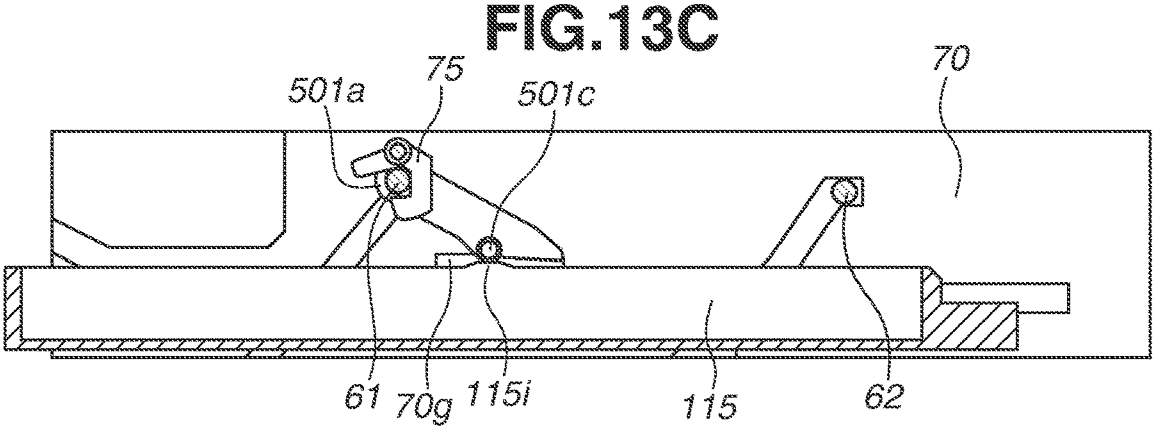
FIG.13D
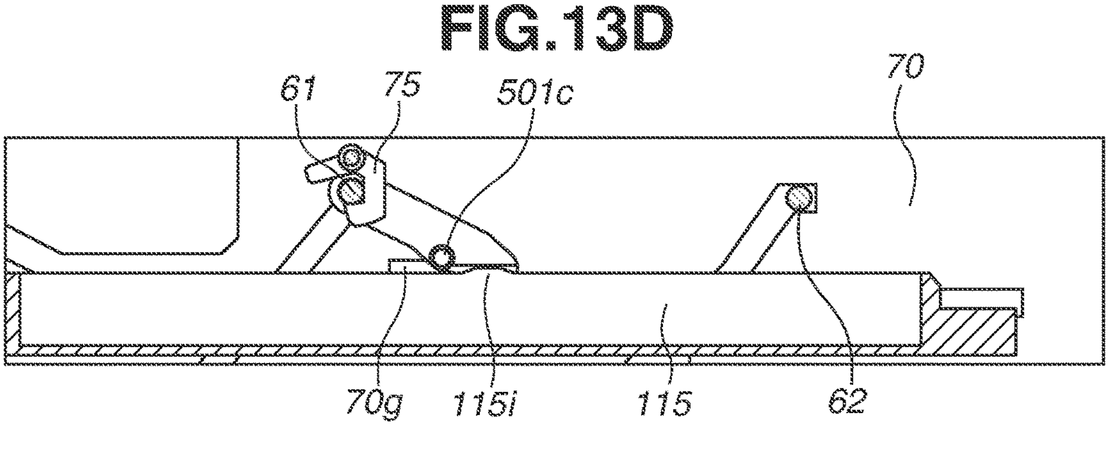

IMAGE FORMING APPARATUS

BACKGROUND

Field

The present disclosure relates to a sheet conveyance apparatus and an image forming apparatus.

Description of the Related Art

Image forming apparatuses, such as copy machines and printers, configured to form an image on a sheet conveyed from a conveyance tray provided above a sheet feeding cassette are known. Japanese Patent Application Laid-Open No. 2016-222384 discusses a technique for performing a jam clearance to remove a sheet stuck in such an image forming apparatus.

SUMMARY

According to an aspect of the present disclosure, an image forming apparatus configured to form an image on a sheet includes a storage unit configured to be attached to and detached from the image forming apparatus and to store the sheet, a conveyance member configured to convey the sheet stored in the storage unit, an image forming unit configured to form the image on the sheet conveyed by the conveyance member, and a conveyance unit disposed above the storage unit and configured to convey the sheet to the conveyance member and to move between a first position for conveying the sheet and a second position retracted downward from the first position, wherein the storage unit includes a positioned portion projecting downstream in an attachment direction of the storage unit with respect to the image forming apparatus, and engagement of the positioned portion with a positioning portion of the image forming apparatus causes the storage unit to be positioned with respect to the image forming apparatus, wherein the conveyance unit includes a contact portion provided at an upstream end portion in the attachment direction and configured to come into contact with the storage unit, and a depressed portion provided at a position corresponding to the positioned portion and depressed downstream from the contact portion in the attachment direction, and wherein, in a case where the contact portion of the conveyance unit comes into contact with the storage unit and the conveyance unit is moved from the second position to the first position by the storage unit, the positioned portion does not come into contact with the depressed portion of the conveyance unit.

Further features of the present disclosure will become apparent from the following description of exemplary embodiments with reference to the attached drawings.

BRIEF DESCRIPTION OF THE DRAWINGS

FIG. 6A is a view illustrating a state where the conveyance unit is held at the first position. FIG. 6B is a view illustrating how regulation of movement of the conveyance unit is released to move the conveyance unit from the first position to the second position.

FIGS. 8A to 8D are views illustrating a relationship between the storage unit and the conveyance unit in moving the conveyance unit from the second position to the first position.

FIGS. 13A to 13D are views illustrating a relationship between the conveyance unit and the interlocking member.

DESCRIPTION OF THE EMBODIMENTS

Figure 1:
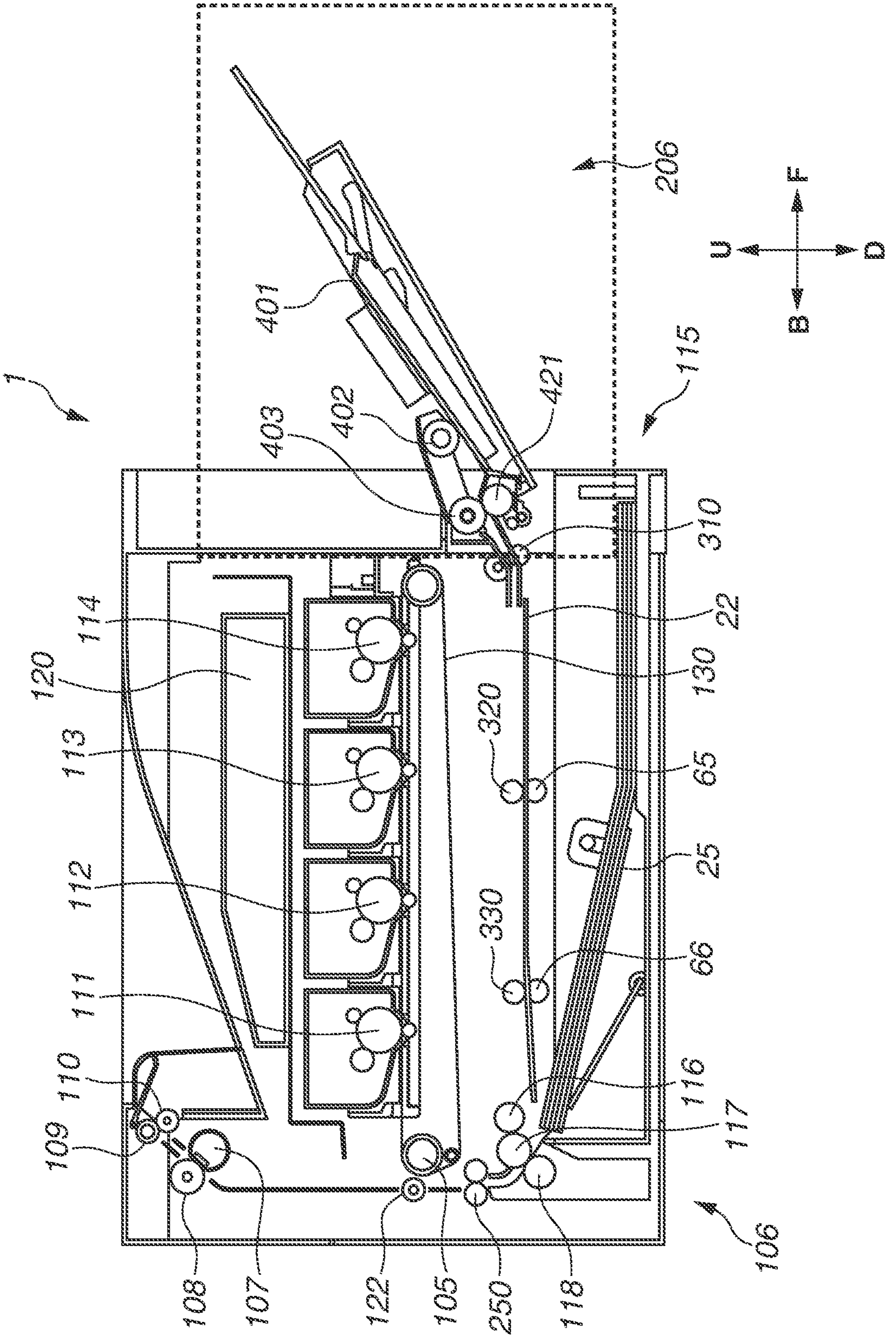
FIG. 1 is a cross-sectional view illustrating an image forming apparatus.

Exemplary embodiments of the present disclosure will be described below with reference to the drawings.

A first exemplary embodiment will be described with reference to FIGS. 1 to 13D. A color laser beam printer will be described as an example of an image forming apparatus 1 according to the present exemplary embodiment. An image forming apparatus that sequentially transfers toner images of different colors on a photosensitive drum onto a belt and then collectively transfers the toner images on the belt onto a sheet material will be described as an example of the image forming apparatus 1 according to the present exemplary embodiment.

The image forming apparatus 1 according to the present exemplary embodiment may be a copy machine, a multifunction peripheral, or a facsimile apparatus. An image forming method used by the image forming apparatus 1 is not limited to an electrophotographic method, and any other image forming method such as an electrostatic recording method or an inkjet method may be used.

A side from which a sheet feeding cassette 115 is pulled out is defined as a front side of the image forming apparatus 1. In the drawings, a frontward direction in which the sheet feeding cassette 115 is pulled out is indicated as front (F) and a backward direction, opposite to the frontward direction, in which the sheet feeding cassette 115 is inserted is indicated as back (B). Further, in the drawings, an upward direction from the front side of the image forming apparatus 1 is indicated as up (U), and a downward direction from the front side of the image forming apparatus 1 is indicated as down (D). Further, in the drawings, a leftward direction from the front side of the image forming apparatus 1 is indicated as left (L), and a rightward direction from the front side of the image forming apparatus 1 is indicated as right (R).

An outline of an entire configuration of the image forming apparatus 1 will be described with reference to FIG. 1. FIG. 1 is a schematic cross-sectional view of the image forming apparatus 1. A sheet feeding unit 106 as a first sheet feeding device includes the sheet feeding cassette 115 and a pick roller 116. The sheet feeding cassette 115 is a storage unit in which a sheet material S is to be stored. The pick roller 116 is a feeding member that feeds the sheet material S. The sheet feeding unit 106 further includes a feed roller 117 and a separation roller 118. The feed roller 117 is a conveyance member that conveys the fed sheet material S to a registration roller pair 250. The separation roller 118 is a separation member facing the feed roller 117. The sheet material S is frictionally separated by a built-in torque limiter (not illustrated) arranged coaxially with the separation roller 118.

In the present exemplary embodiment, the sheet feeding unit 106 forms a part of the image forming apparatus 1, and the sheet feeding cassette 115 is attachable to and detachable from the image forming apparatus 1. A direction in which the sheet feeding cassette 115 is attached is indicated by an arrow B in FIG. 1.

When a control unit (not illustrated) transmits a print signal, the pick roller 116 and the feed roller 117 rotate in a clockwise direction in FIG. 1 during sheet feeding, and the sheet material S stacked on a stacking plate 25 is conveyed to the registration roller pair 250. The sheet material S is then conveyed to a secondary transfer nip portion formed by an in-belt roller 105 and a secondary transfer roller 122. The in-belt roller 105 is on the inside of an intermediate transfer belt 130 and supports the intermediate transfer belt 130. The secondary transfer roller 122 faces the in-belt roller 105 via the intermediate transfer belt 130.

The image forming apparatus 1 according to the present exemplary embodiment includes image forming units 111, 112, 113, and 114.

The image forming units 111, 112, 113, and 114 each include at least a photosensitive drum on which an electrostatic latent image is to be formed, a development roller that supplies toner to the electrostatic latent image and develops the electrostatic latent image, and a charging roller that charges the photosensitive drum.

In the image forming units 111, 112, 113, and 114, electrostatic latent images are sequentially formed on outer surfaces of the respective photosensitive drums by laser light from a laser scanner 120 and then developed by the development roller, so that toner images are formed on the photosensitive drums.

The toner images formed on the photosensitive drums of the image forming units 111, 112, 113, and 114 are primarily transferred onto the intermediate transfer belt 130. Then, the toner images transferred to the intermediate transfer belt 130 are collectively transferred onto the sheet material S conveyed to the secondary transfer nip portion. Then, the sheet material S with the toner images transferred thereto is conveyed to a nip portion between a fixing film 107 and a pressure roller 108. At the nip portion, the sheet material S is heated and pressured, whereby the toner images are fixed to the sheet material S. The sheet material S with the toner images fixed thereto is discharged by discharge rollers 109 and 110.

A manual sheet feeding unit 206 as a second sheet feeding device includes a sheet feeding tray 401 and a pick roller 402. The sheet feeding tray 401 is a stacking member on which the sheet material S is to be stacked. The pick roller 402 is a feeding member that feeds the sheet material S. The manual sheet feeding unit 206 further includes a feed roller 403 and a separation roller 421. The feed roller 403 is a conveyance member that conveys the fed sheet material S to a conveyance roller pair 310. The separation roller 421 is a separation member.

When the control unit (not illustrated) transmits a print signal, the pick roller 402 and the feed roller 403 rotate in the clockwise direction in FIG. 1 during sheet feeding, and the sheet material S stacked on the sheet feeding tray 401 is conveyed to the conveyance roller pair 310, a conveyance roller pair 320, and a conveyance roller pair 330. Then, the toner images are transferred onto the sheet material S, and the transferred toner images are fixed to the sheet material S. Thereafter, the sheet material S is discharged by the discharge rollers 109 and 110.

Figure 2A:
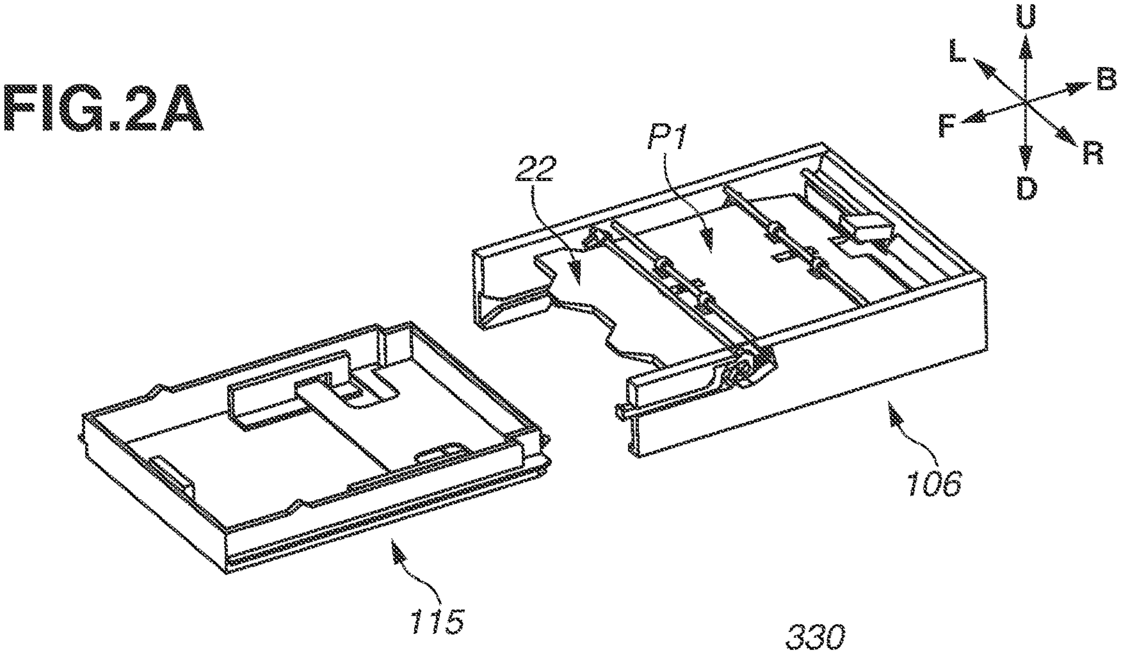
FIG. 2A is a perspective view illustrating a state where a conveyance unit is at a first position.
Figure 2B:
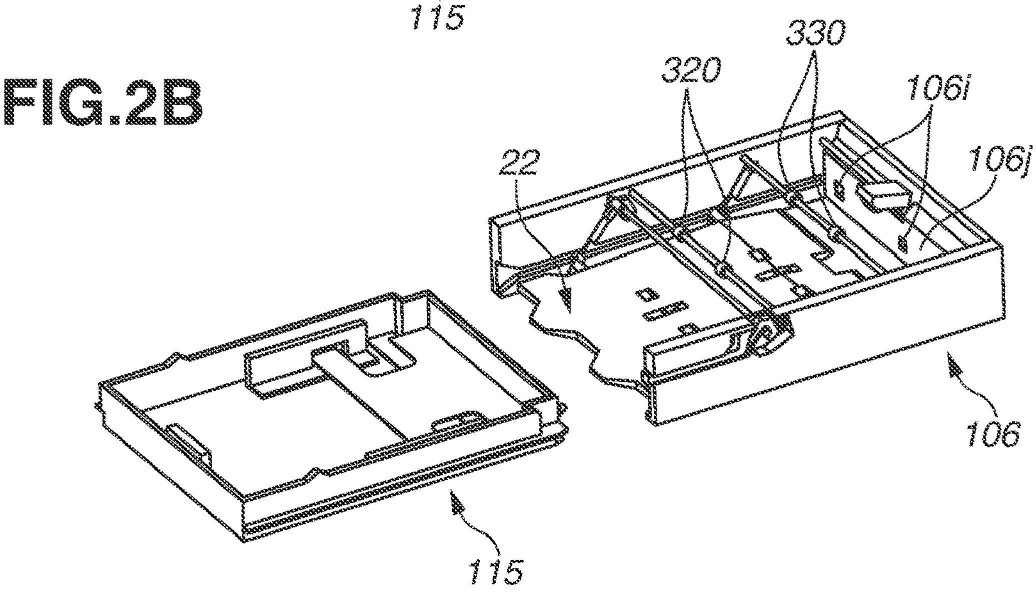
FIG. 2B is a perspective view illustrating a state where the conveyance unit is at a second position.
Figure 2C:
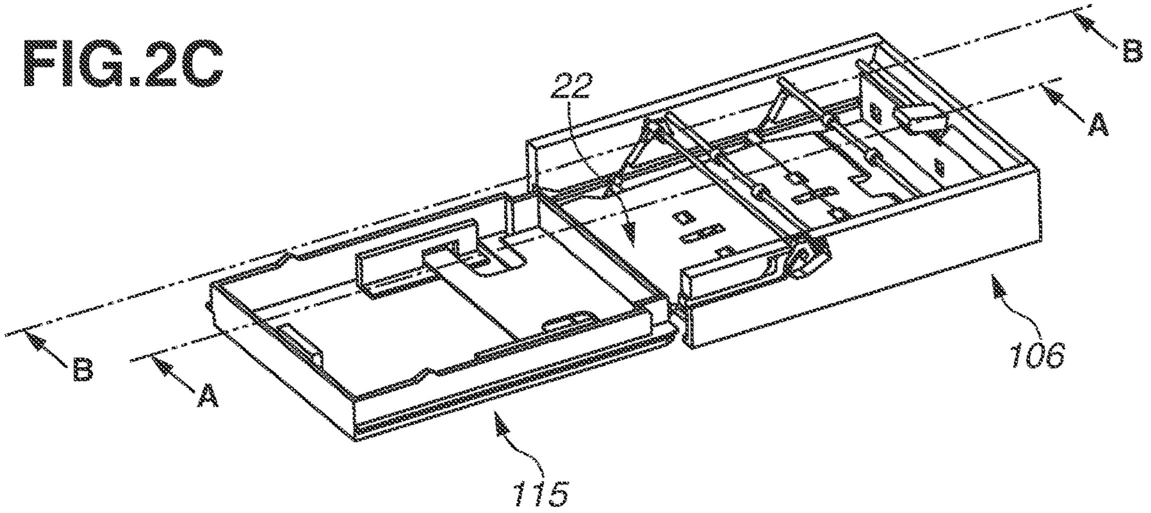
FIG. 2C is a perspective view illustrating a state where a storage unit is brought into contact with the conveyance unit while the conveyance unit is at the second position.

FIGS. 2A to 2C are perspective views illustrating the sheet feeding unit 106, the sheet feeding cassette 115, and a conveyance tray 22. The conveyance tray 22 is a conveyance unit configured to move inside the image forming apparatus 1. FIGS. 2A to 2C are views from a direction that is substantially opposite to that of the cross-sectional view in FIG. 1. The conveyance tray 22 is configured to move between a first position and a second position. The second position is a position to which the conveyance tray 22 is retracted from the first position. The conveyance tray 22 is disposed above the sheet feeding cassette 115.

FIG. 2A illustrates a state where the conveyance tray 22 is at the first position. The first position is a position at which an upper side of the conveyance tray 22 forms a sheet conveyance path P1.

FIG. 2B illustrates a state where the conveyance tray 22 is at the second position. The second position is a position in a direction D to which the conveyance tray 22 is lowered along a guide groove that is a guide unit to be described below. In other words, the second position is a position retracted downward from the first position. Moving the conveyance tray 22 to the second position separates the conveyance roller pairs 320 and 330 from driven roller pairs 65 and 66 opposing the conveyance roller pairs 320 and 330, respectively. This facilitates the removal of a jammed sheet.

The conveyance tray 22 is slidable along the guide groove and is movable from the first position in FIG. 2A to the second position in FIG. 2B. The conveyance tray 22 is also movable from the second position in FIG. 2B to the first position in FIG. 2A. In a state where the conveyance tray 22 is at the first position as illustrated in FIG. 2A, the sheet feeding cassette 115 is movable in a pull-out direction and an insertion direction with respect to the sheet feeding unit 106.

Figure 3A:
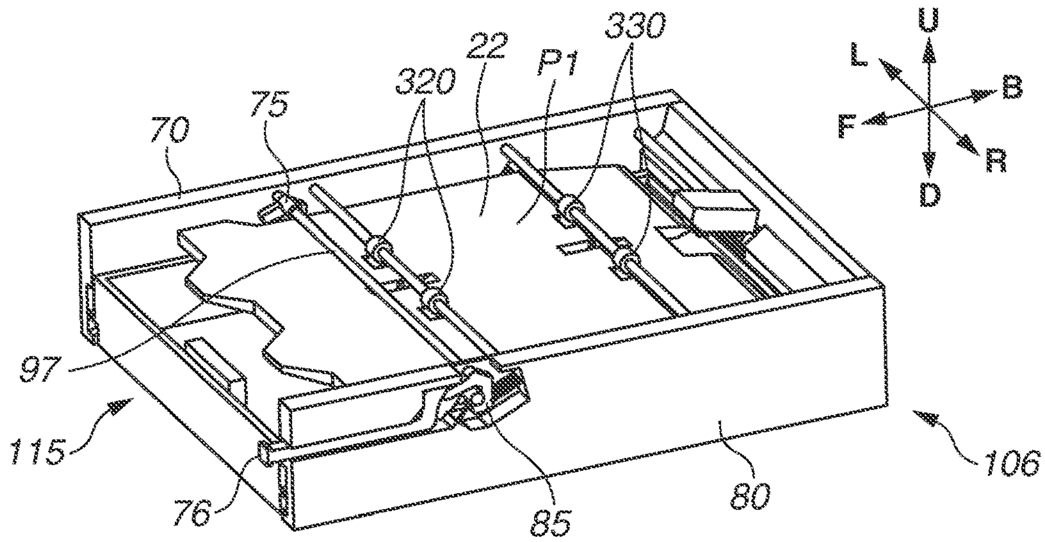
FIG. 3A is a perspective view illustrating a state where the conveyance unit is at a conveyance position (the first position) to form a conveyance path and is attached to the image forming apparatus.
Figure 3B:
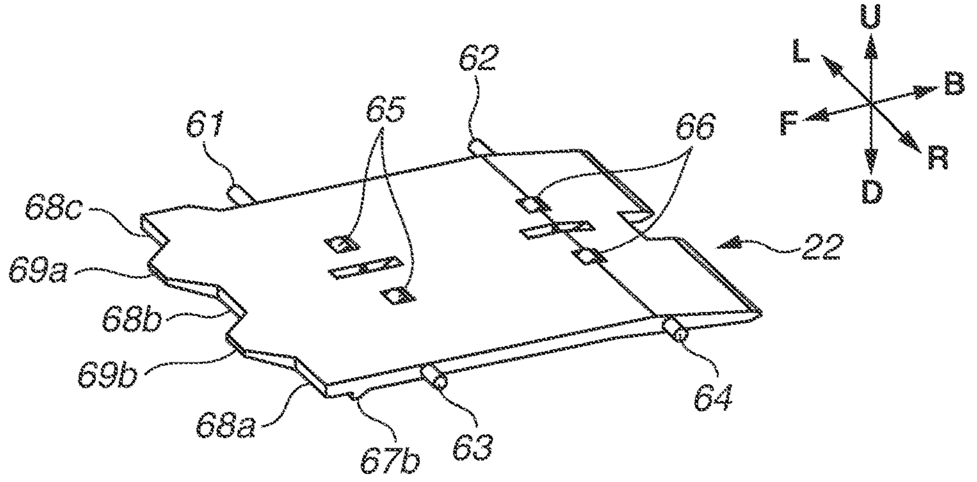
FIGS. 3B and 3C are perspective views each illustrating the conveyance unit.
Figure 3C:
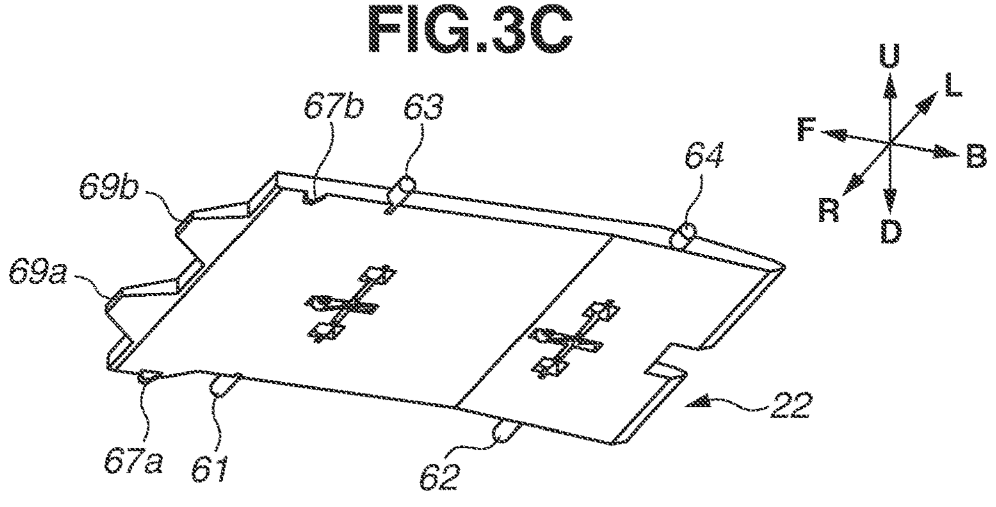

FIGS. 3A to 3C illustrate the sheet feeding unit 106 and the conveyance tray 22. FIG. 3A is a perspective view illustrating a state where the conveyance tray 22 is at a conveyance position (the first position) to form the conveyance path P1 and the sheet feeding cassette 115 is attached to the sheet feeding unit 106. FIGS. 3B and 3C are perspective views illustrating the conveyance tray 22 seen from different directions.

The conveyance tray 22 rotatably supports the driven roller pairs 65 and 66 and is biased by a bias spring (not illustrated). While the conveyance tray 22 is at the first position illustrated in FIG. 3A, the conveyance tray 22 and the conveyance roller pairs 320 and 330 of the sheet feeding unit 106 form a conveyance nip portion.

As illustrated in FIGS. 3B and 3C, the conveyance tray 22 includes tray projections 61, 62, 63, and 64. The tray projections 61, 62, 63, and 64 are projecting portions that project in an axial direction of the driven roller pairs 65 and 66. The tray projections 61 and 63 are first guided portions and are respectively provided on one end side and the other end side in the axial direction. The tray projections 62 and 64 are second guided portions and are respectively provided on one end side and the other end side in the axial direction. Further, as illustrated in FIG. 3C, the conveyance tray 22 includes conveyance tray cams 67*a* and 67*b*. The conveyance tray cams 67*a* and 67*b* are cam members projecting from the conveyance tray 22 toward the direction D.

The conveyance tray 22 further includes tray contact portions 69*a* and 69*b* on the front (F) side of the conveyance tray 22. The tray contact portions 69*a* and 69*b* are second contact portions and are configured to come into contact with cassette contact portions 115*f* and 115*g* to be described below. The cassette contact portions 115*f* and 115*g* are first contact portions. On the contrary, depressed portions 68*a*, 68*b*, and 68*c* are configured not to come into contact with any portions of the sheet feeding cassette 115.

The tray projection 61 to 64 are guided along the guide groove, which is a guide portion as the guide unit to be described below, whereby the conveyance tray 22 is movable between the first position and the second position.

Figure 4A:
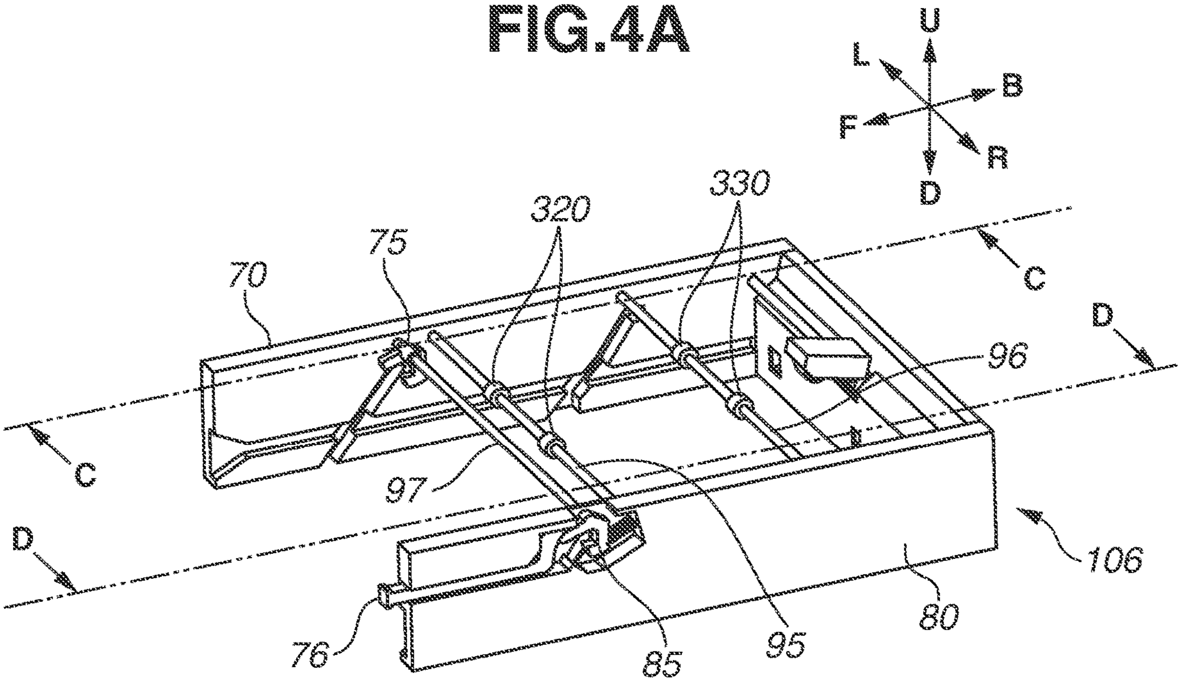
FIG. 4A is a perspective view illustrating the conveyance unit.
Figure 4B:
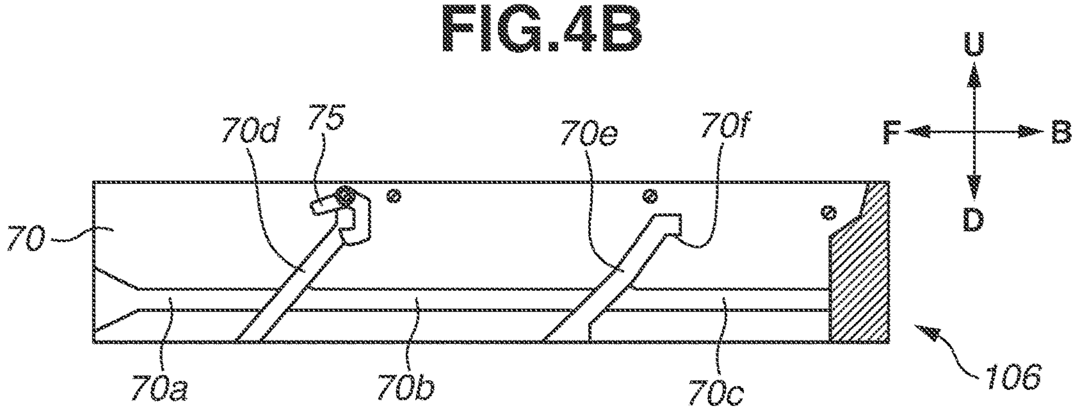
FIG. 4B is a cross-sectional view taken along a section line C in FIG. 4A.

FIG. 4A is a perspective view illustrating the sheet feeding unit 106. The sheet feeding unit 106 includes a first side plate 70 and a second side plate 80. The first side plate 70 and the second side plate 80 support the conveyance roller pairs 320 and 330. Rotary shafts 95 and 96 are supported between the first side plate 70 and the second side plate 80. When the rotary shafts 95 and 96 are rotated by a driving source (not illustrated), the conveyance roller pairs 320 and 330 are rotated. FIG. 4B is a cross-sectional view taken along a section line C in FIG. 4A and illustrates the guide groove of the first side plate 70, which is a first guide portion having an opening inside the first side plate 70. In FIG. 4B, the guide groove of the first side plate 70 includes horizontal portions 70*a*, 70*b*, and 70*c*, a front oblique portion 70*d*, a rear oblique portion 70*e*, and a rear horizontal portion 70*f*. The horizontal portions 70*a*, 70*b*, and 70*c* guide a sliding portion 115*b* of the sheet feeding cassette 115 to support the sheet feeding cassette 115 so that the sheet feeding cassette 115 is slidable in the pull-out direction and the insertion direction. The sliding portion 115*b* is a guided portion to be described below. The front oblique portion 70*d* slidably guides the tray projection 61 of the conveyance tray 22.

The rear oblique portion 70*e* slidably guides the tray projection 62 of the conveyance tray 22. The rear horizontal portion 70*f* slidably guides the tray projection 62 of the conveyance tray 22, and while the conveyance tray 22 is at the first position, the tray projection 62 is supported from the bottom by the rear horizontal portion 70*f*.

Figure 4C:
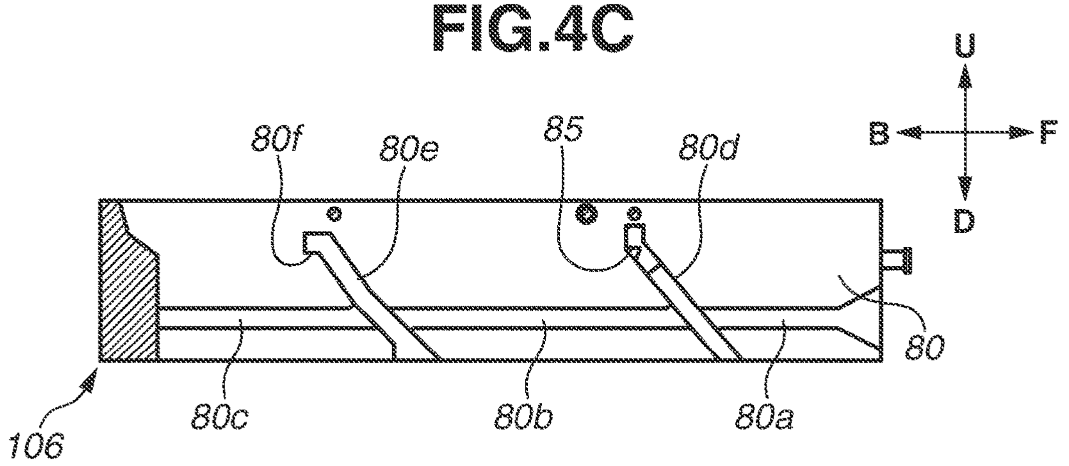
FIG. 4C is a cross-sectional view taken along a section line D in FIG. 4A.

FIG. 4C is a cross-sectional view taken along a section line D in FIG. 4A. As illustrated in FIG. 4C, the guide groove, which is a second guide portion shaped symmetrically with the guide groove of the first side plate 70, is also provided inside the second side plate 80. The second side plate 80 includes, as the guide groove, horizontal portions 80*a*, 80*b*, and 80*c*, a front oblique portion 80*d*, a rear oblique portion 80*e*, and a rear horizontal portion 80*f*. The tray projections 63 and 64 of the conveyance tray 22 are slidably guided along the guide groove of the second side plate 80 similarly to the first side plate 70 side.

Figure 5A:
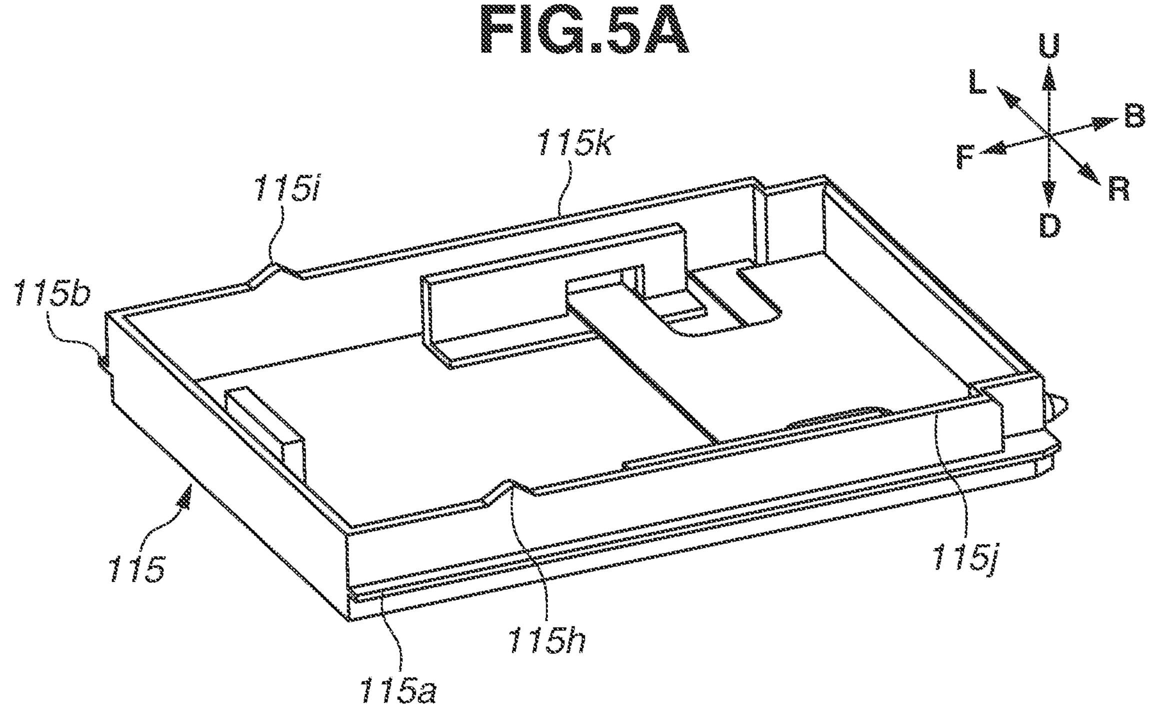
FIG. 5A is a perspective view illustrating the storage unit.
Figure 5B:
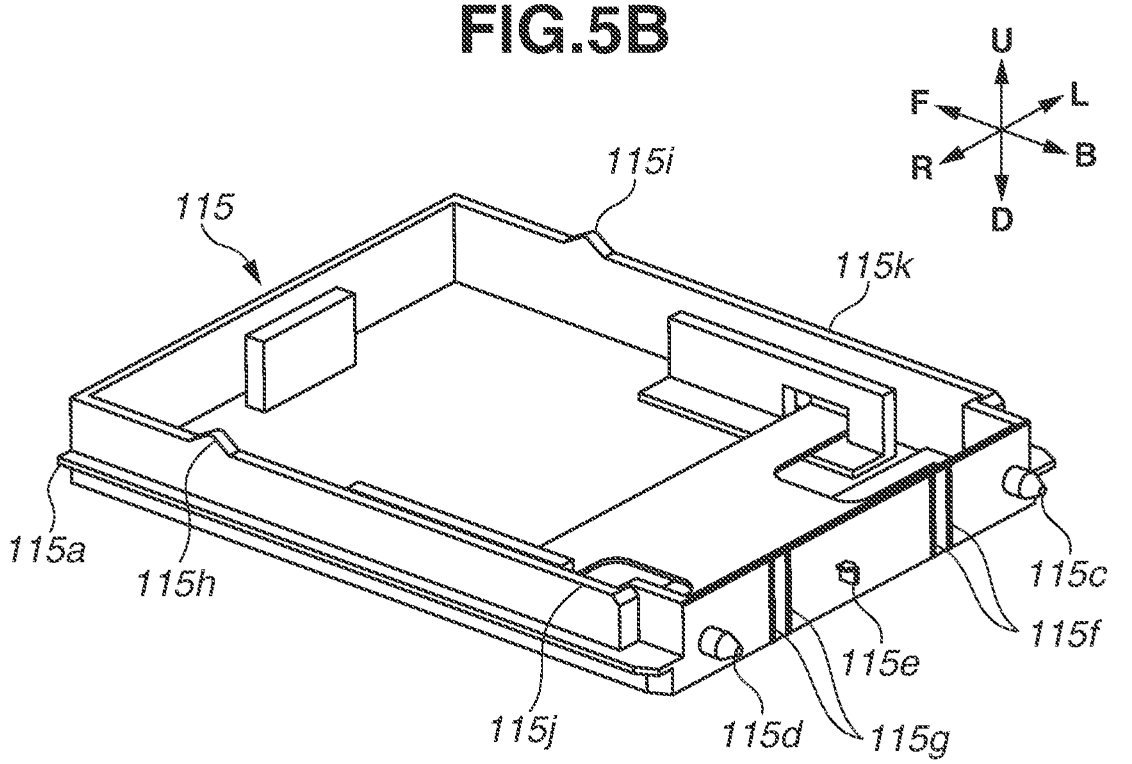
FIG. 5B is a perspective view illustrating the storage unit seen from a direction different from that in FIG. 5A.

FIGS. 5A and 5B are perspective views illustrating the sheet feeding cassette 115. FIGS. 5A and 5B are perspective views illustrating the sheet feeding cassette 115 seen from different directions. As illustrated in FIG. 5A, a sliding portion 115*a* is provided on one side of the sheet feeding cassette 115, and the sliding portion 115*b* is provided on the other side of the sheet feeding cassette 115. The sliding portions 115*a* and 115*b* are slidable in inserting the sheet feeding cassette 115 into the sheet feeding unit 106.

As illustrated in FIG. 5B, the sheet feeding cassette 115 includes positioning bosses 115*c* and 115*d* as positioned portions, and the positioning bosses 115*c* and 115*d* project downstream in the attachment direction. In inserting the sheet feeding cassette 115 into the sheet feeding unit 106, the sheet feeding cassette 115 comes into contact with a contact surface 106j (refer to FIG. 2B) of the sheet feeding unit 106. Positioning portions 106i (refer to FIG. 2B) of the sheet feeding unit 106 are engaged with the positioning bosses 115*c* and 115*d*, whereby the sheet feeding cassette 115 is positioned with respect to the sheet feeding unit 106. The sheet feeding cassette 115 includes a sensor rib 115*e* on the back (B) side of the sheet feeding cassette 115. The sensor rib 115*e* is a detected portion. When the sheet feeding cassette 115 is attached to the sheet feeding unit 106, the sensor rib 115*e* is engaged with a detection sensor (not illustrated) of the sheet feeding unit 106. As a result, the image forming apparatus 1 detects the attachment of the sheet feeding cassette 115 to the sheet feeding unit 106.

The sheet feeding cassette 115 further includes the cassette contact portions 115*f* and 115*g* on the back (B) side of the sheet feeding cassette 115. The cassette contact portions 115*f* and 115*g* are configured to come into contact with the tray contact portions 69*a* and 69*b* of the conveyance tray 22. The cassette contact portions 115*f* and 115*g* are contacted portions, and the tray contact portions 69*a* and 69*b* are contact portions. The tray contact portions 69*a* and 69*b* are provided in an upstream end portion of the conveyance tray 22 in the attachment direction of the sheet feeding cassette 115.

A cassette rib 115*j* and a cassette cam 115*h* are provided on the right (R) side of the sheet feeding cassette 115, and a cassette rib 115*k* and a cassette cam 115*i* are provided on the left (L) side of the sheet feeding cassette 115. The cassette ribs 115*j* and 115*k* are pressing portions. The cassette ribs 115*j* and 115*k* and the cassette cams 115*h* and 115*i* are slidable with the conveyance tray cams 67*b* and 67*a* of the conveyance tray 22, respectively.

Next, lock members 75 and 85 (refer to FIG. 3A) will be described. The lock members 75 and 85 are configured to position the conveyance tray 22 with respect to the sheet feeding unit 106.

The sheet feeding unit 106 includes the lock members 75 and 85 and an operation lever 76 in order to hold the conveyance tray 22 at the first position. The lock members 75 and 85 are regulation members, and the operation lever 76 is an operation member configured to move the lock members 75 and 85. The lock member 75 is on the inside of the first side plate 70, whereas the lock member 85 is on the outside of the second side plate 80.

Figure 6A:
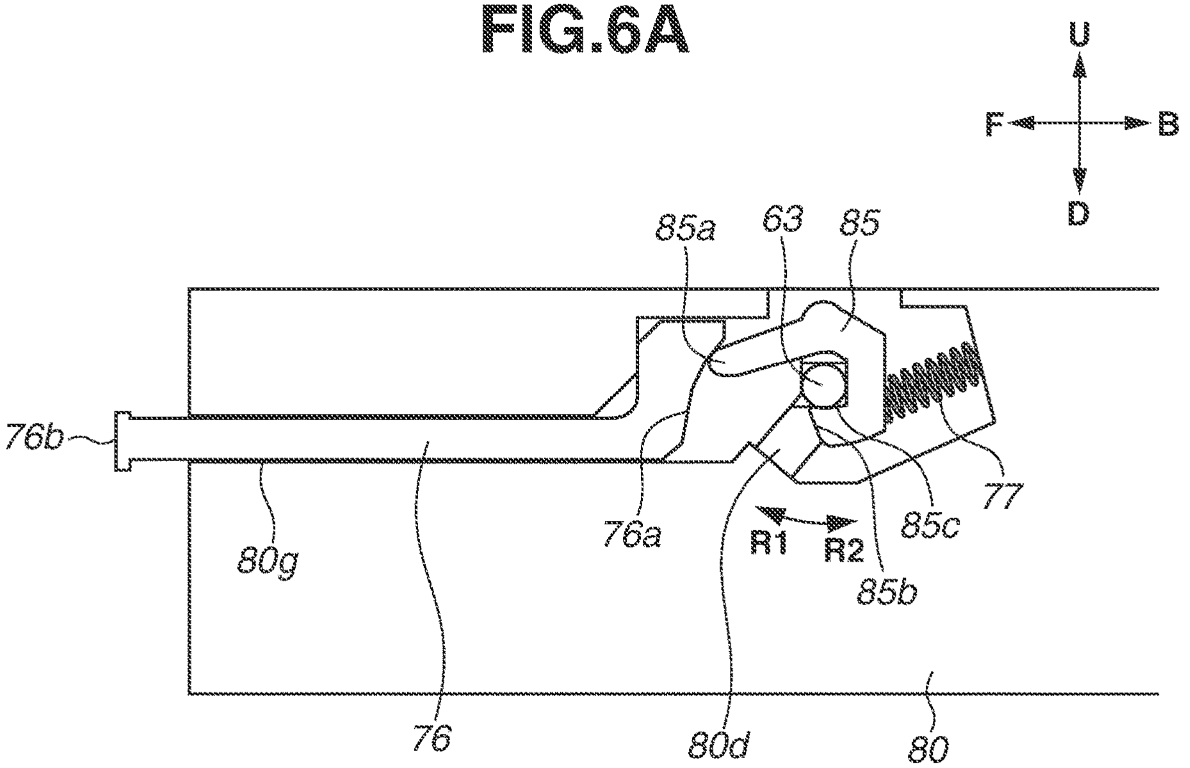
FIGS. 6A and 6B are views illustrating a relationship between a regulation member and an operation member.
Figure 6B:
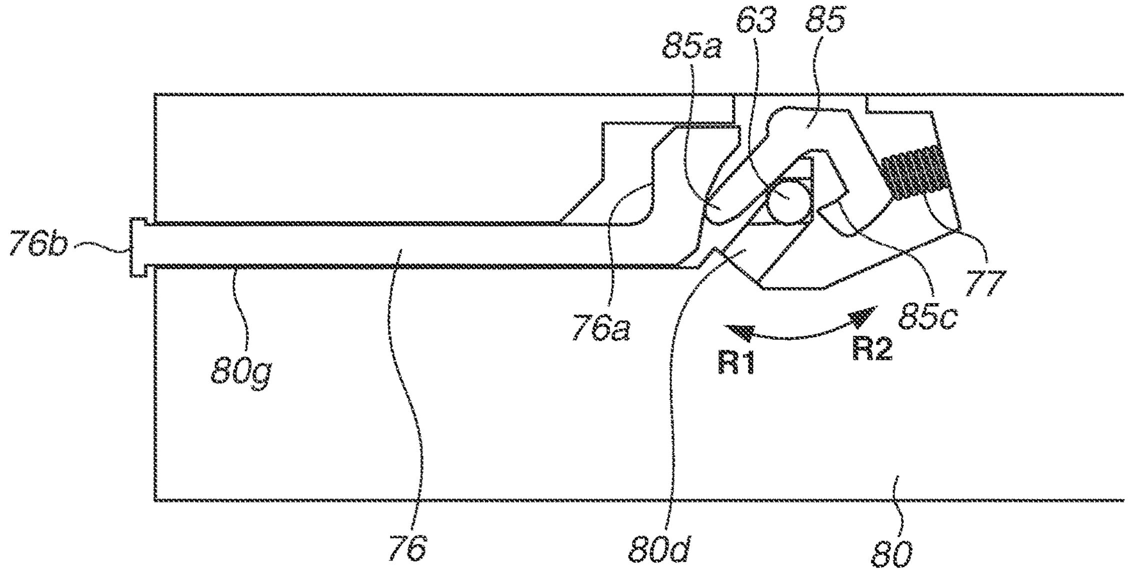

FIGS. 6A and 6B illustrate a relationship between the lock member 85 and the operation lever 76. FIG. 6A illustrates a state where the conveyance tray 22 is held at the first position. As illustrated in FIG. 6A, the lock member 85 includes a lock contact portion 85*a*, an inclined surface 85*b*, and a regulation portion 85*c*. The lock contact portion 85*a* comes into contact with the operation lever 76, and the inclined surface 85*b* comes into contact with the tray projection 63. In a case where the conveyance tray 22 is moved from the second position to the first position, the tray projection 63 is guided along the front oblique portion 80*d*, whereby the inclined surface 85*b* and the tray projection 63 come into contact with each other.

The operation lever 76 is provided at the front (F) of the lock member 85, and the operation lever 76 is slidable forward and backward on a guide portion 80*g* of the second side plate 80. The operation lever 76 includes a contact portion 76*a* on the back (B) side and a pressed portion 76*b* on the front (F) side. A bias spring 77 is provided to bias the lock member 85 in a direction R1.

In moving the conveyance tray 22 from the second position to the first position, the tray projection 63 is raised and comes into contact with the inclined surface 85*b*. Thereafter, the tray projection 63 is further moved upward, and the lock member 85 is pushed by the tray projection 63 and is rotated in a direction R2. When the tray projection 63 passes the inclined surface 85*b*, the lock member 85 is rotated in the direction R1 by the bias spring 77. At this time, the tray projection 63 is engaged with the regulation portion 85*c*, whereby the conveyance tray 22 is held at the first position.

The lock member 75 at the left (L) in FIG. 3A is similar to the lock member 85, and thus redundant descriptions thereof will be omitted. When the operation lever 76 is pressed, the lock member 75 is moved similarly to the lock member 85.

Next, how the conveyance tray 22 is unlocked and moved from the first position to the second position will be described with reference to FIG. 6B. As illustrated in FIG. 6B, in a case where a user presses the pressed portion 76*b* of the operation lever 76 in the backward direction (the direction B), the operation lever 76 is moved in the backward direction (the direction B), and the lock member 85 is rotated in the direction R2 against the bias spring 77. At this time, the tray projection 63 is separated from the regulation portion 85*c* of the lock member 85 and, at the same time, the tray projection 61 at the left (L) is also separated from the lock member 75. As a result, the tray projections 61 to 64 are lowered along the guide grooves of the first side plate 70 and the second side plate 80, whereby the conveyance tray 22 is moved to the second position. In lowering the conveyance tray 22 toward the second position, the conveyance tray 22 is lowered by a force greater than the weight of the conveyance tray 22, with the force of the bias spring (not illustrated) biasing the driven roller pairs 65 and 66 of the conveyance tray 22.

FIG. 2A illustrates a state where the sheet feeding cassette 115 is pulled out from the sheet feeding unit 106 and the conveyance tray 22 is at the first position. Thereafter, when the sheet feeding cassette 115 is inserted into the sheet feeding unit 106, the image forming apparatus 1 can be ready for print processing. FIG. 2B illustrates a state where the sheet feeding cassette 115 is pulled out from the sheet feeding unit 106 and the conveyance tray 22 is at the second position. To be ready for print processing, the conveyance tray 22 is to be moved from the second position to the first position.

When the conveyance tray 22 is pushed in the backward direction (the direction B), the conveyance tray 22 is moved obliquely upward along the guide grooves, and the tray projections 61 and 63 are regulated by the lock members 75 and 85, respectively, whereby the conveyance tray 22 is maintained at the first position.

As illustrated in FIG. 2C, when the sheet feeding cassette 115 is inserted into the image forming apparatus 1, the sheet feeding cassette 115 can push the conveyance tray 22 in the backward direction (the direction B). First, in the state of FIG. 2B, when the user moves the sheet feeding cassette 115 in the backward direction (the direction B), the sheet feeding cassette 115 comes into contact with the conveyance tray 22 as illustrated in FIG. 2C.

Figure 7:
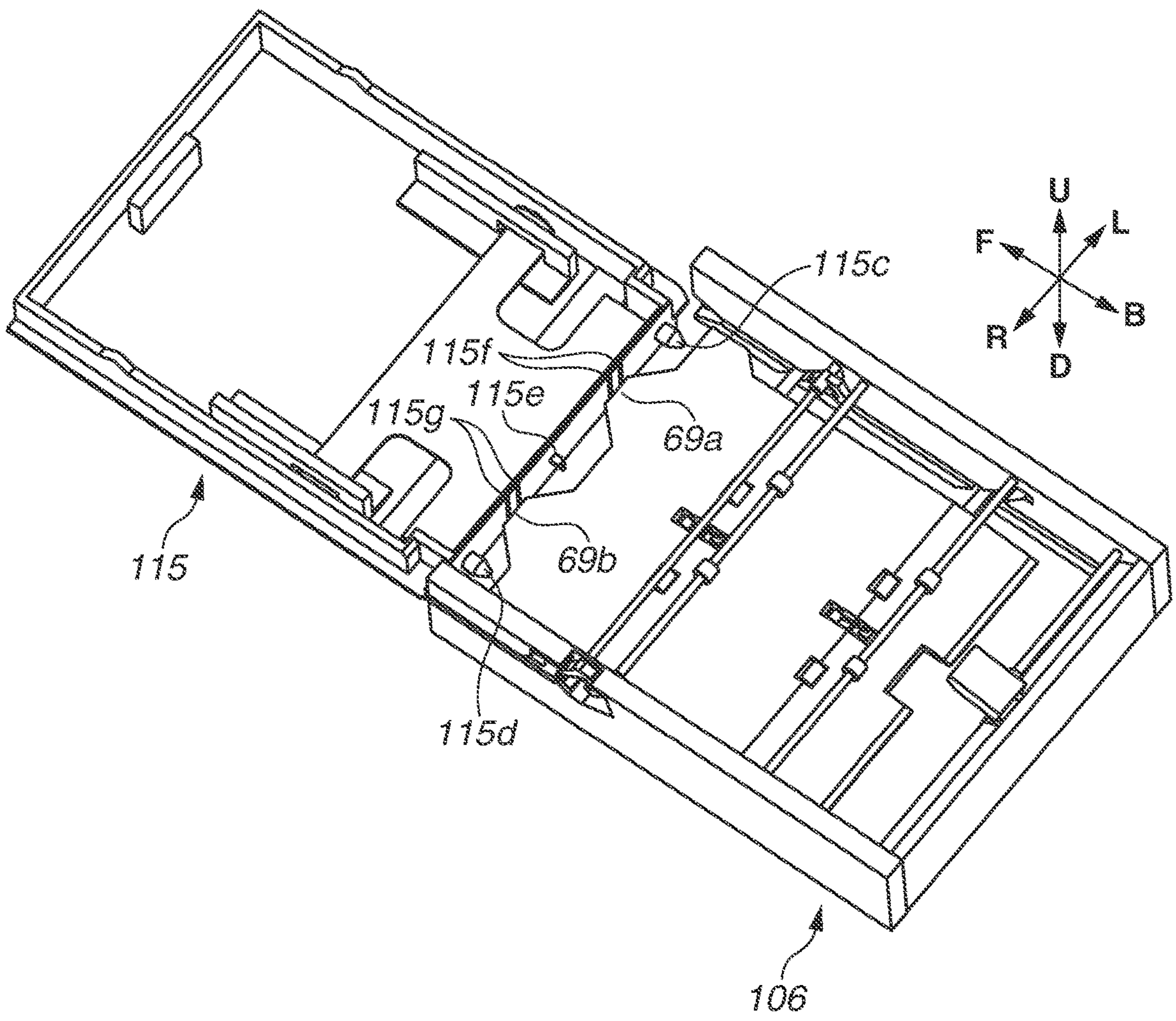
FIG. 7 is a perspective view illustrating the conveyance unit and the storage unit seen from a direction different from that in FIG. 2C.

FIG. 7 is a perspective view illustrating the state of FIG. 2C seen from a direction different from FIG. 2C. In this state, the cassette contact portions 115*f* and 115*g* of the sheet feeding cassette 115 come into contact with the tray contact portions 69*a* and 69*b* of the conveyance tray 22. On the contrary, the positioning bosses 115*c* and 115*d* and the sensor rib 115*e* do not come into contact with the conveyance tray 22 because the depressed portions 68*a*, 68*b*, and 68*c* are provided in the conveyance tray 22.

In this state, when the sheet feeding cassette 115 is inserted in the backward direction (the direction B), the sheet feeding cassette 115 pushes the conveyance tray 22 in the backward direction (the direction B), and the conveyance tray 22 is raised along the guide grooves. Thereafter, the conveyance tray 22 is held at the first position, and the sheet feeding cassette 115 is attached to the image forming apparatus 1.

According to the present exemplary embodiment, the positioning bosses 115*c* and 115*d* and the sensor rib 115*e* of the sheet feeding cassette 115 are configured not to interfere with the conveyance tray 22 in inserting the sheet feeding cassette 115 into the image forming apparatus 1 even in a case where the conveyance tray 22 is at the second position.

Thus, the sheet feeding cassette 115 can raise and move the conveyance tray 22 to the first position, and the sheet feeding cassette 115 can be attached to the image forming apparatus 1. This improves user operability.

A comparative example will be described with reference to FIGS. 11A to 11C. According to the present exemplary embodiment, as illustrated in FIG. 3B, the conveyance tray 22 includes the tray contact portions 69*a* and 69*b*, and the tray contact portions 69*a* and 69*b* are configured to come into contact with the cassette contact portions 115*f* and 115*g* illustrated in FIG. 7, respectively. The tray contact portions 69*a* and 69*b* project from the conveyance tray 22. Thus, the depressed portions 68*a* and 68*c* of the conveyance tray 22 are positioned to correspond to the positioning bosses 115*d* and 115*c* of the sheet feeding cassette 115, respectively, in a direction intersecting the attachment direction and are configured not to come into contact with the positioning bosses 115*d* and 115*c*. The cassette contact portions 115*f* and 115*g* correspond to the tray contact portions 69*a* and 69*b*, respectively, and each have a shape extending in a height direction (a vertical direction) as illustrated in FIG. 7.

Figure 11A:
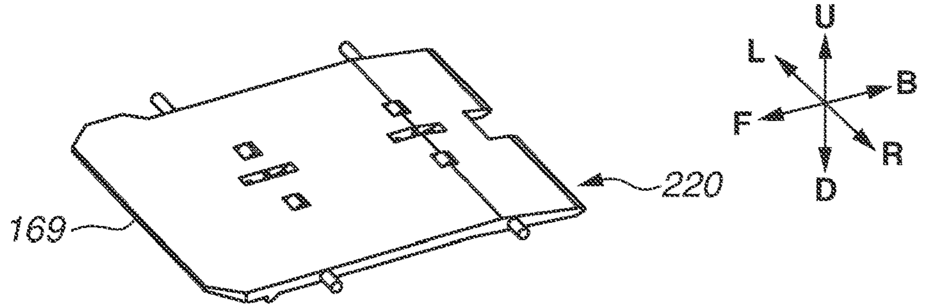
FIGS. 11A to 11C are views illustrating a comparative example.
Figure 11B:
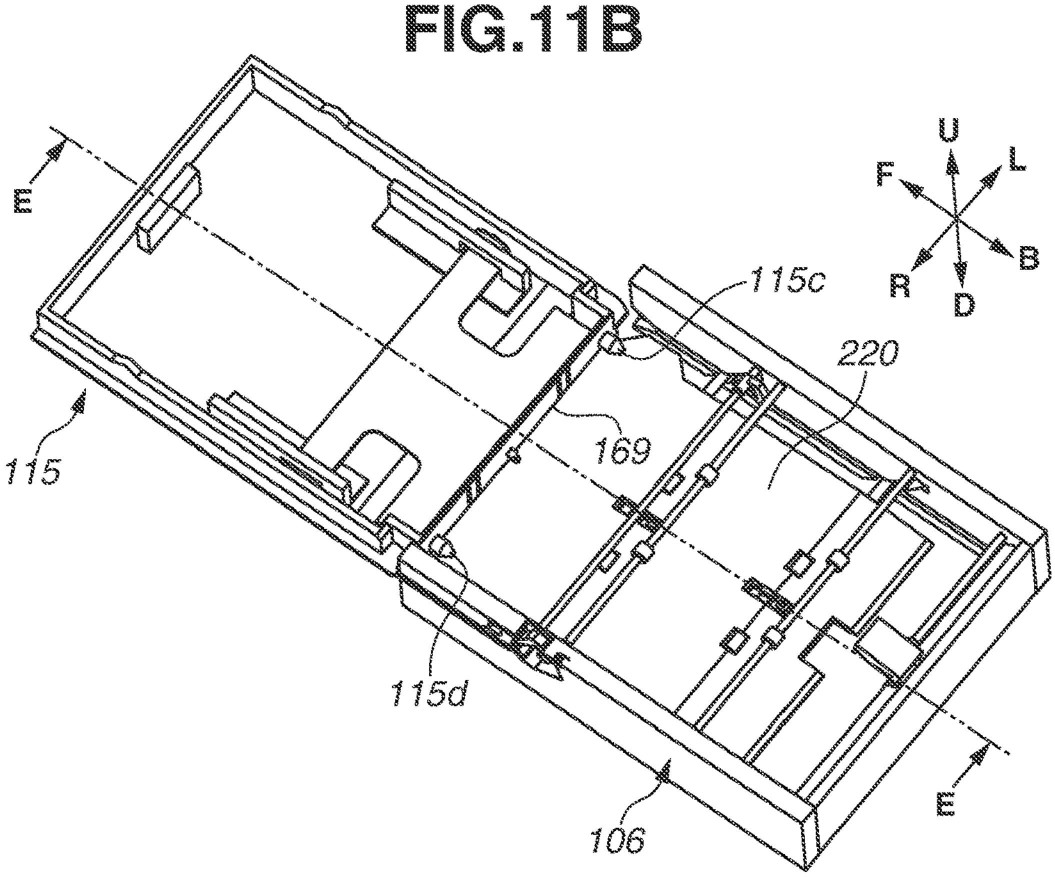
Figure 11C:
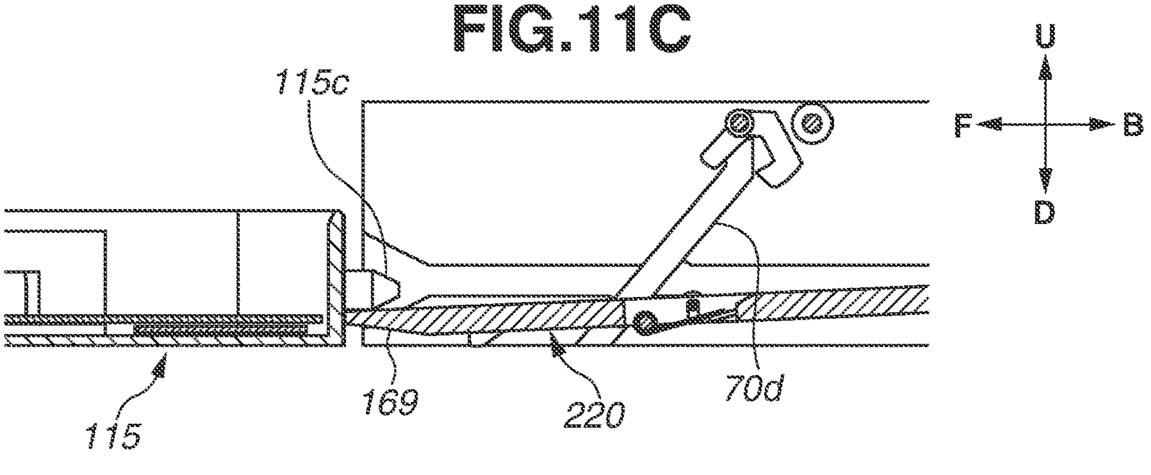

On the contrary, an upstream portion 169 of a conveyance tray 220 according to the comparative example has a flat surface as illustrated in FIG. 11A. FIG. 11B illustrates a state where the conveyance tray 220 is at the second position and the sheet feeding cassette 115 is being inserted into the sheet feeding unit 106. This state will be described with reference to FIG. 11C along a section line E in FIG. 11B. The upstream portion 169 of the conveyance tray 220 is slipped below the positioning boss 115*c* of the sheet feeding cassette 115.

In this state, when the sheet feeding cassette 115 is pushed further in the backward direction (the direction B), the conveyance tray 220 is attempted to be raised in the upward direction (the direction U) along the front and rear oblique portions 70*d* and 70*e* serving as the guide groove, but the upstream portion 169 of the conveyance tray 220 interferes with the positioning boss 115$c$ of the sheet feeding cassette 115. This hinders the conveyance tray 220 from being raised in the upward direction (the direction U), and the user cannot insert the sheet feeding cassette 115 into the image forming apparatus 1. Because of this, the user is to remove the sheet feeding cassette 115 from the image forming apparatus 1 once and then hold and raise the conveyance tray 220 to the first position.

According to the present exemplary embodiment, the tray contact portions 69$a$ and 69$b$ project as illustrated in FIG. 3B, and the depressed portions 68$a$, 68$b$, and 68$c$ are configured not to come into contact with the sheet feeding cassette 115. Thus, even in a case where the conveyance tray 22 is at the second position, the sheet feeding cassette 115 pushes the conveyance tray 22 in inserting the sheet feeding cassette 115, so that the conveyance tray 22 can be moved from the second position to the first position. Details thereof will be described with reference to FIGS. 8A to 8D and 9A to 9D.

How the conveyance tray 22 is moved from the second position to the first position will be described with reference to FIGS. 8A to 8D and 9A to 9D. FIG. 8A is a cross-sectional view taken along a section line A in FIG. 2C, and FIG. 9A is a cross-sectional view taken along a section line B in FIG. 2C.

Figure 9A:
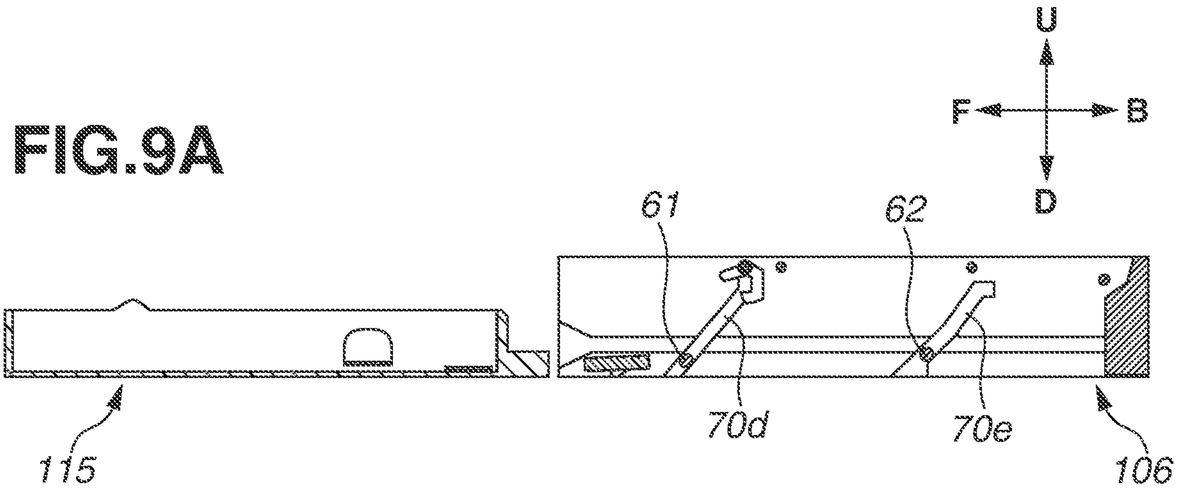
FIGS. 9A to 9D are another views illustrating the relationship between the storage unit and the conveyance unit in moving the conveyance unit from the second position to the first position.

The sheet feeding cassette 115 and the conveyance tray 22 in FIG. 8A are at the same positions as those of the sheet feeding cassette 115 and the conveyance tray 22 in FIG. 9A. Similarly, the sheet feeding cassette 115 and the conveyance tray 22 in FIGS. 8B, 8C, and 8D are at the same positions as those of the sheet feeding cassette 115 and the conveyance tray 22 in FIGS. 9B, 9C, and 9D, respectively.

Figure 9B:
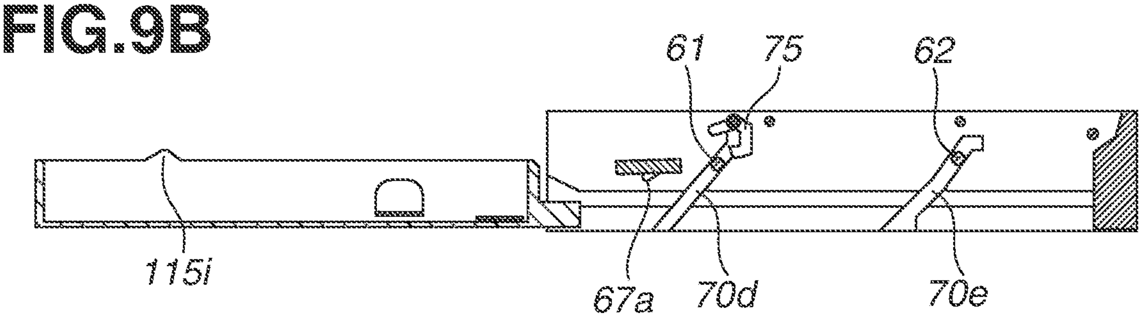
Figure 9C:
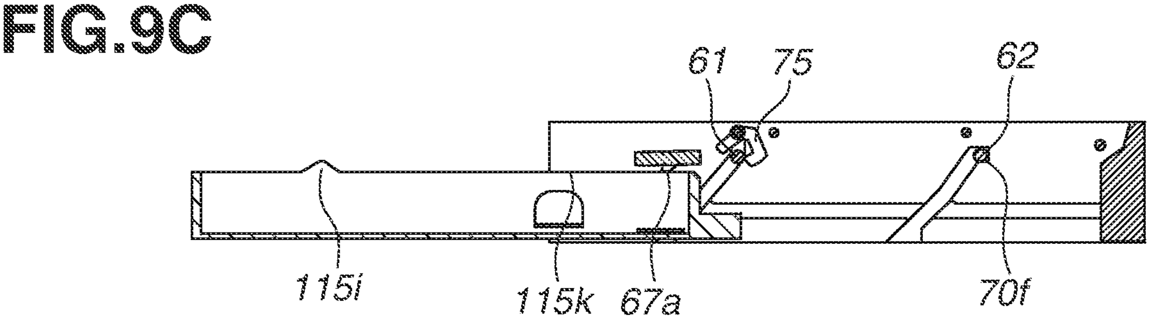
Figure 9D:
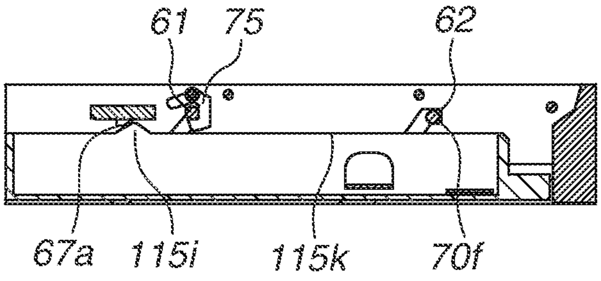

In FIGS. 8A and 9A, the conveyance tray 22 is at the second position, whereas in FIGS. 8D and 9D, the conveyance tray 22 is at the first position. How the sheet feeding cassette 115 is inserted is sequentially illustrated in FIGS. 8A, 8B, 8C, and 8D in this order. While FIGS. 8A to 8D and 9A to 9D illustrate operations at the left (L), operations at the right (R) are similar to the operations at the left (L).

First, as illustrated in FIG. 8A, the cassette contact portion 115$f$ of the sheet feeding cassette 115 comes into contact with the tray contact portion 69$a$ of the conveyance tray 22. As illustrated in FIG. 8B, when the sheet feeding cassette 115 is inserted in the backward direction (the direction B), the tray contact portion 69$a$ is moved in the backward direction (the direction B) while moved in the upward direction (the direction U) along the cassette contact portion 115$f$. At this time, as illustrated in FIG. 9B, the tray projection 61 is raised along the front oblique portion 70$d$ and the tray projection 62 is raised along the rear oblique portion 70$e$.

Figure 10:
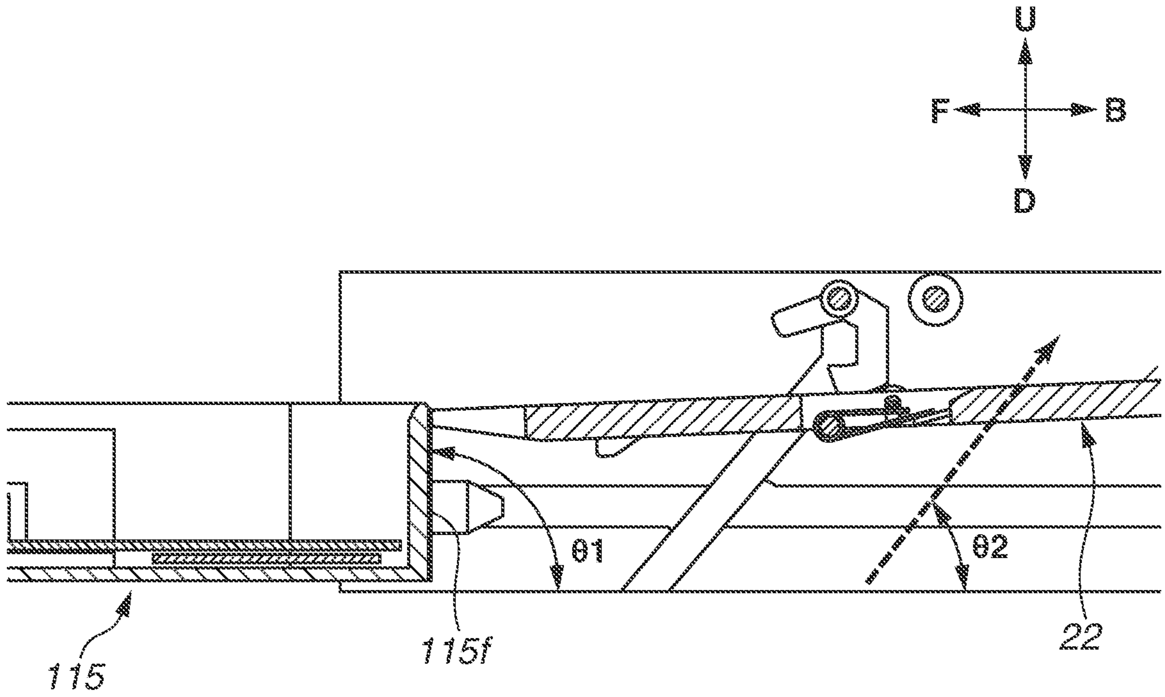
FIG. 10 is a cross-sectional view illustrating a relationship between a contacted portion of the storage unit and the conveyance unit.

A shape of the cassette contact portion 115$f$ will be described with reference to FIG. 10. FIG. 10 illustrates an area near the cassette contact portion 115$f$ illustrated in FIG. 8B. Assuming that θ1 is an angle of the cassette contact portion 115$f$ with respect to the insertion direction of the sheet feeding cassette 115 (the backward direction or the direction B) and θ2 is a movement direction of the conveyance tray 22, a relation of θ1>θ2 is satisfied, and thus the conveyance tray 22 moving in the backward direction (the direction B) can also move in the upward direction (the direction U). While the cross-sectional shape of the cassette contact portion 115$f$ is a straight shape in FIG. 10, the cross-sectional shape is not limited to the straight shape and may be a curved shape or a bent shape.

As illustrated in FIG. 8C, when the sheet feeding cassette 115 is further inserted in the backward direction (the direction B), the conveyance tray cam 67$a$ of the conveyance tray 22 is slid in contact with the cassette rib 115$k$ of the sheet feeding cassette 115. At this time, as illustrated in FIG. 9C, the tray projection 62 is engaged with the rear horizontal portion 70$f$, whereby the position of the tray projection 62 in the height direction is determined. At this time, the tray projection 61 is in contact with the lock member 75 but is not held.

As illustrated in FIG. 8D, when the sheet feeding cassette 115 is inserted further in the backward direction (the direction B) to attach the sheet feeding cassette 115 to the sheet feeding unit 106, the cassette cam 115$i$ of the sheet feeding cassette 115 is moved in the backward direction (the direction B) while raising the conveyance tray cam 67$a$ of the conveyance tray 22. At this time, the tray projection 61 is held by the lock member 75 after raised in the upward direction (the direction U), so that the conveyance tray 22 is held at the first position.

As described above, according to the present exemplary embodiment, even in a state where the conveyance tray 22 is at the second position for releasing the sheet conveyance path P1, the sheet feeding cassette 115 can be inserted into the image forming apparatus 1 and the conveyance tray 22 can be moved to the first position for forming the sheet conveyance path P1.

Thus, the user does not need to hold and move the conveyance tray 22 to the first position for forming the sheet conveyance path P1 before inserting the sheet feeding cassette 115 into the image forming apparatus 1. This improves operability.

An interlocking member for moving the conveyance tray 22 to the first position by the insertion of the sheet feeding cassette 115 in a case where the conveyance tray 22 is incompletely attached will be described with reference to FIGS. 12A to 12C and 13A to 13D.

Figure 12A:
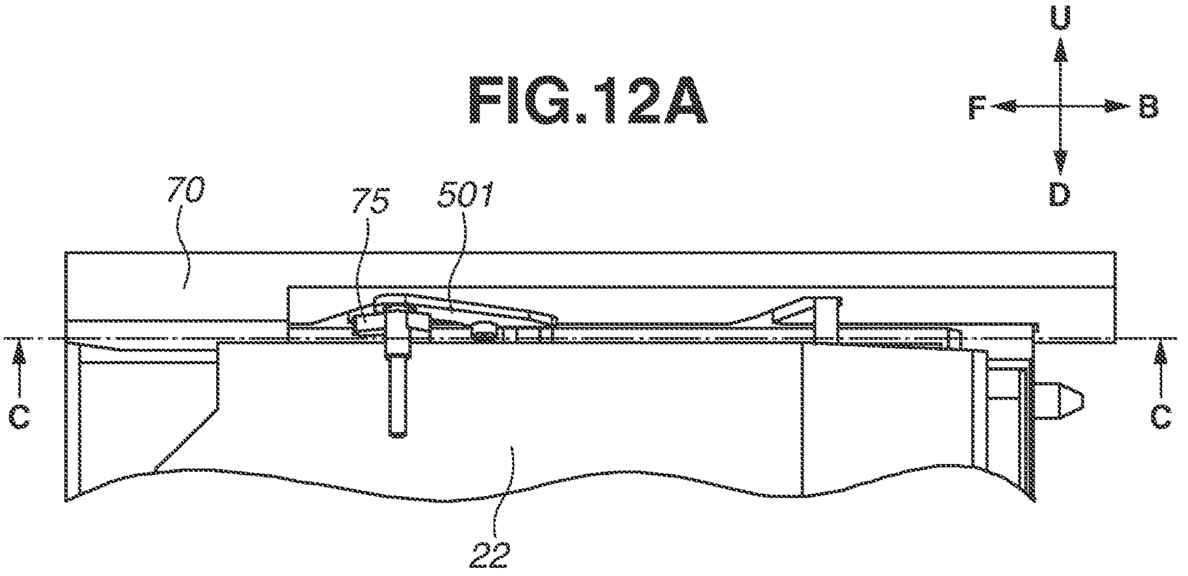
FIGS. 12A to 12C are views illustrating a positional relationship between an interlocking member and the conveyance unit.
Figure 12B:
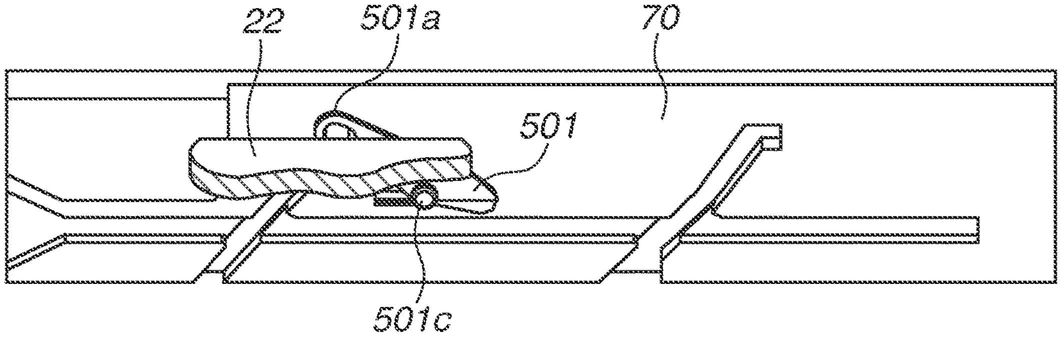
Figure 12C:
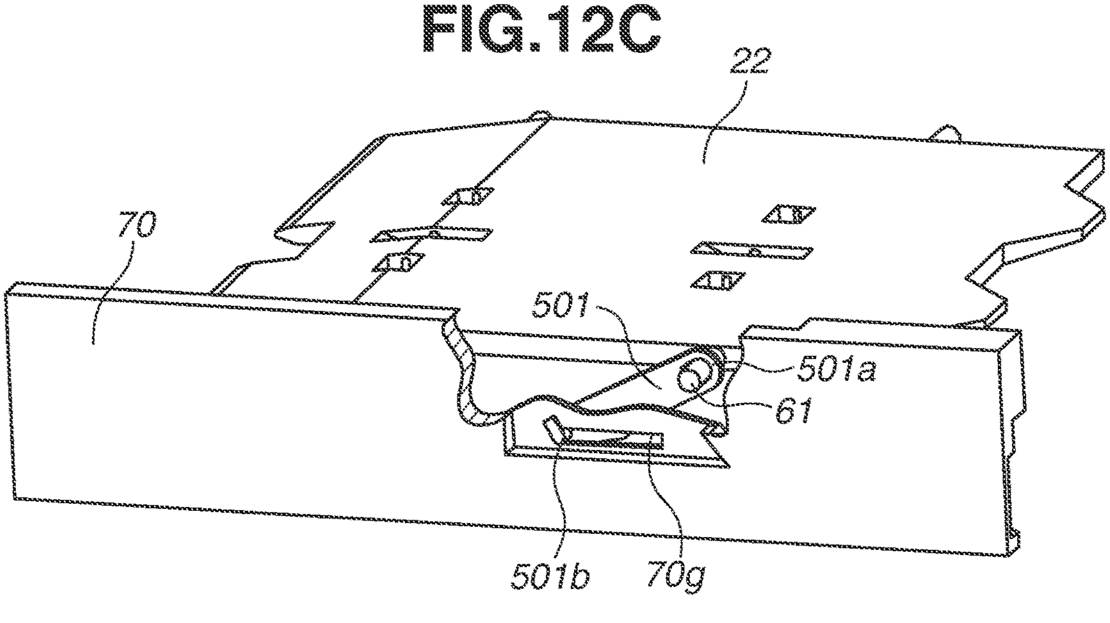

FIG. 12A illustrates a positional relationship between a link member 501, the conveyance tray 22, and the first side plate 70. The link member 501 is the interlocking member. FIG. 12B illustrates an area near the link member 501 seen from a direction R of a main body of the image forming apparatus 1. FIG. 12C is a partial sectional view illustrating the area near the link member 501 seen from a direction L of the main body of the image forming apparatus 1.

As illustrated in FIGS. 12A, 12B, and 12C, a support end 501$a$ of the link member 501 is engaged with the tray projection 61 provided on the upstream side of the conveyance tray 22, and a support end 501$b$ of the link member 501 is supported by the first side plate 70 so that the support end 501$b$ is linearly movable. The support end 501$a$ is an engagement portion, and the support end 501$b$ is a fulcrum portion. Further, the link member 501 includes a boss 501$c$. The boss 501$c$ is a pressed portion that is pressed by the cassette cam 115$i$ to push up the conveyance tray 22 toward the conveyance position (the upward direction or the direction U). The cassette cam 115$i$ is a pressing portion. The boss 501$c$ is provided between the support ends 501$a$ and 501$b$ in a lengthwise direction of the link member 501.

FIGS. 13A to 13D are views along a cross-section C-C in FIG. 12A, illustrating a process of moving the conveyance tray 22 from a jam clearance position (in FIG. 13A) to the conveyance position (in FIG. 13D). As illustrated in FIG. 13A, in a state where the conveyance tray 22 is at the jam clearance position (the second position), the support end 501$a$ of the link member 501 is moved along a movement path of the conveyance tray 22. Then, the support end 501$a$ is linearly moved along a link groove 70$g$ of the first side plate 70 to a position in the direction F and is supported at the position by the first side plate 70.

As illustrated in FIG. 13B, during the movement of the conveyance tray 22 to the conveyance position, the support end 501*a* of the link member 501 is moved along the movement path of the conveyance tray 22, is linearly moved along the link groove 70*g* of the first side plate 70 to a position in the direction B, and is supported at the position by the first side plate 70.

As illustrated in FIG. 13C, immediately before the conveyance tray 22 is locked at the first position, the support end 501*a* of the link member 501 is moved along the movement path of the conveyance tray 22, is linearly moved along the link groove 70*g* of the first side plate 70 to a position in the direction B, and is supported at the position by the first side plate 70. In a case where the conveyance tray 22 is incompletely pushed into a lock position in moving the conveyance tray 22 from the jam clearance position to the conveyance position, inserting the sheet feeding cassette 115 enables the conveyance tray 22 to be pushed into the first position.

In moving the sheet feeding cassette 115 in the direction B, the cassette cam 115*i* pushes the boss 501*c* of the link member 501 in the direction U. The link member 501 is rotated in a clockwise direction in FIG. 13C around the support end 501*b* illustrated in FIG. 12C as a pivot fulcrum, and pushes the conveyance tray 22 toward the conveyance position (the direction U) via the support end 501*a*. As a result, the support end 501*a* causes the tray projection 61 to reach a regulation position where the tray projection 61 comes into contact with the lock member 75. At this time, the lock member 75 is engaged with the tray projection 61 and maintains the conveyance tray 22 at the first position.

As illustrated in FIG. 13D, after the sheet feeding cassette 115 is inserted into the conveyance position while the conveyance tray 22 is at the conveyance position, the boss 501*c* is separated from the sheet feeding cassette 115, and the link member 501 is supported by the tray projection 61 of the conveyance tray 22 and the link groove 70*g* of the first side plate 70.

The link member 501 may be provided in the second side plate 80 in the direction R. Further, the link member 501 may be provided in both the first side plate 70 and the second side plate 80.

The link member 501 makes it possible to provide a configuration in which the conveyance tray 22 is reliably moved to the first position by the insertion of the sheet feeding cassette 115 in a case where the conveyance tray 22 is incompletely attached.

In the present exemplary embodiment, the configuration in which the tray projection 61 projecting in the axial direction of the conveyance tray 22 is moved by the sheet feeding cassette 115 via the link member 501 has been described. In a case where the link member 501 is not provided, for example, a rib projecting from the conveyance tray 22 in the direction D may be provided in the conveyance tray 22. In order to raise the conveyance tray 22 using the rib projecting in the direction D, a height of the rib extending from the conveyance tray 22 in the direction D s is to be increased to a height of an opening for inserting the sheet feeding cassette 115. This makes it difficult to secure a large jam clearance space. Thus, the configuration according to the present exemplary embodiment is more advantageous in size reduction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-163856, filed Oct. 5, 2021, and No. 2021-186698, filed Nov. 16, 2021, which are hereby incorporated by reference herein in their entirety.

What is claimed is:

1. An image forming apparatus configured to form an image on a sheet, the image forming apparatus comprising:

a storage unit configured to be attached to and detached from the image forming apparatus and to store the sheet;

a conveyance member configured to convey the sheet stored in the storage unit;

an image forming unit configured to form the image on the sheet conveyed by the conveyance member;

a conveyance unit disposed above the storage unit and configured to convey the sheet to the conveyance member and to move between a first position for conveying the sheet and a second position retracted downward from the first position; and a contact surface configured to come into contact with the storage unit to be attached to the image forming apparatus and include a positioning hole opened in an attachment direction in the contact surface, wherein the storage unit includes a boss projecting downstream in the attachment direction with respect to the image forming apparatus, and the storage unit is positioned relative to the image forming apparatus by inserting the boss into the positioning hole, wherein the conveyance unit includes a contact portion provided at an upstream end portion in the attachment direction and configured to come into contact with the storage unit, and a depressed portion provided at a position corresponding to the boss and depressed downstream from the contact portion in the attachment direction, wherein, in a case where the contact portion of the conveyance unit comes into contact with the storage unit and the conveyance unit is moved from the second position to the first position by the storage unit, the boss does not come into contact with the depressed portion of the conveyance unit, wherein a plurality of bosses includes the boss and is provided in a direction intersecting the attachment direction, and wherein a plurality of depressed portions includes the depressed portion and is provided correspondingly to the plurality of bosses in the direction intersecting the attachment direction.

2. The image forming apparatus according to claim 1, wherein a plurality of contact portions of the conveyance unit includes the contact portion and is provided in the direction intersecting the attachment direction, and wherein, in a state where the plurality of contact portions of the conveyance unit is in contact with the storage unit, the plurality of contact portions is at a position corresponding to a position between the plurality of bosses.

3. The image forming apparatus according to claim 1, wherein, in a case where the conveyance unit is moved from the second position to the first position by the storage unit, a portion of the storage unit that comes into contact with the contact portion of the conveyance unit further includes a contacted portion having a shape extending in a height direction.

4. The image forming apparatus according to claim 1, wherein the conveyance unit further includes a driven roller configured to be driven to convey the sheet.

5. The image forming apparatus according to claim 4, further comprising a first guide portion, wherein the conveyance unit further includes a first guided portion projecting in an axial direction of the driven roller and the first guide portion is configured to guide the first guided portion in moving the conveyance unit from the first position to the second position.

6. The image forming apparatus according to claim 5, further comprising a regulation member configured to regulate the first guided portion to maintain the conveyance unit at the first position.

7. The image forming apparatus according to claim 6, wherein the conveyance unit further includes a second guided portion disposed downstream of the first guided portion in the attachment direction and projecting in the axial direction of the driven roller.

8. An image forming apparatus configured to form an image on a sheet, the image forming apparatus comprising:

a storage unit configured to be attached to and detached from the image forming apparatus and to store the sheet;

a conveyance member configured to convey the sheet stored in the storage unit;

an image forming unit configured to form the image on the sheet conveyed by the conveyance member;

a conveyance unit disposed above the storage unit and configured to convey the sheet to the conveyance member and to move between a first position for conveying the sheet and a second position retracted downward from the first position;

an interlocking member configured to come into contact with the storage unit and to move the conveyance unit by coming into contact with the storage unit, wherein the conveyance unit includes a driven roller configured to be driven to convey the sheet and a first guided portion projecting in an axial direction of the driven roller, wherein the interlocking member moves the conveyance unit at the second position to the first position by coming into contact with the storage unit during a process of attaching the storage unit to the image forming apparatus;

a first guide portion configured to guide the first guided portion in moving the conveyance unit from the first position to the second position; and a regulation member configured to regulate the first guided portion to maintain the conveyance unit at the first position, wherein the interlocking member includes an engagement portion configured to engage with the first guided portion, a fulcrum portion serving as a pivot fulcrum, and a pressed portion provided between the engagement portion and the fulcrum portion in a longitudinal direction of the interlocking member and configured to be pressed upward by the storage unit, and wherein the storage unit includes a pressing portion configured to press the pressed portion during the process of attaching the storage unit to the image forming apparatus.

9. The image forming apparatus according to claim 8, wherein, during the process of attaching the storage unit to the image forming apparatus, the pressing portion presses the pressed portion to pivot the interlocking member around the fulcrum portion, and the pivoting of the interlocking member causes the engagement portion to move the first guided portion to a regulation position where the first guided portion comes into contact with the regulation member.

10. The image forming apparatus according to claim 9, wherein, after the engagement portion moves the first guided portion to the regulation position where the first guided portion comes into contact with the regulation member, the pressing portion is separated from the pressed portion to cause the interlocking member to be supported by the first guided portion.

11. The image forming apparatus according to claim 10, wherein the conveyance unit further includes a second guided portion disposed downstream of the first guided portion in an attachment direction of the storage unit and projecting in the axial direction of the driven roller.

* * * * *